Patented May 9, 1950

2,507,143

UNITED STATES PATENT OFFICE 2,507,143

STABILIZATION OF POLYMERIZATION PRODUCTS

Charles J. Chaban, Toledo, Ohio, assignor to Stabelan Chemical Company, Toledo, Ohio, a partnership No Drawing. Application June 17, 1949, Serial No. 99,885

15 Claims. (Cl. 260—45.7)

The invention relates to the treatment of polymerization products, such as synthetic resins intended for use in various applications including transparent, translucent, uncolored, dyed, pigmented or filled films, coatings, filaments and moldings, and particularly to the treatment of polymerization products with agents that improve their stability and durability.

One of the principal limitations on the usefulness of polymerization products is their limited resistance to heat and light and their limited stability or durability when subjected to flexing, abrasion or outdoor exposure. Polymerized vinyl compounds, for example, when subjected to outdoor exposure or to an accelerated weathering test or a carbon arc Fadeometer test, turn brown or black and become brittle in a relatively short time, particularly when they consist of transparent or translucent films or filaments which are not protected by the opacifying action provided by the presence of fillers or pigments.

The principal object of the invention is to produce a very marked improvement in the heat resistance, light resistance, weather resistance, abrasion resistance and resistance to flexing both at ordinary temperatures and at subnormal temperatures of polymerization products. More specific objects and advantages are apparent from the description, which illustrates and discloses but is not intended to limit the scope of the invention.

Treatment of a polymerization product in accordance with the present invention is carried out after the polymerization. Such treatment comprises subjecting the polymerization product to intimate contact with (a) an inorganic peroxide and (b) a salt of a metal of group II of the periodic table having an atomic weight between 85 and 140 with an acid not stronger than metaboric acid, whose one per cent aqueous solution has a pH from about 8 to about 12.

Although the treatment of a polymerization product in accordance with the invention produces a very marked improvement in the properties of the polymerization product, it does not produce a violent effect like the action of a catalyst during the polymerization of an unsaturated compound. Peroxides have been used as catalysts in the polymerization of unsaturated compounds, but in order to prevent the polymerization from becoming too violent and to prevent inferior polymers from being produced they are used during the polymerization in a concentration that is only a small fraction of the concentration of a peroxide which in the present treatment gives an appreciable improvement in the properties of the polymerization product. Although the concentration of a polymerization catalyst is minute as compared with the concentration of a peroxide used in the present treatment, it heretofore has been considered desirable to remove even the relatively small trace of polymerization catalyst that remains after the polymerization.

The polymerization products whose properties are improved by the present treatment include the product of the polymerization of a composition comprising one or more substances whose molecule contains a polymerizable olefinic double bond, such as chloroprene, vinyl chloride, vinyl acetate, styrene, vinylidene chloride, methyl methacrylate, ethyl methacrylate, methyl acrylate, acrylonitrile, and other derivatives of acrylic acid, ethylene, isobutylene, isoprene, butadiene and other polymerizable unsaturated hydrocarbons. The present treatment is particularly useful in improving the properties of a thermoplastic organic polymer, such as a polymer of a vinyl compound, e. g., a vinyl hydrocarbon or a vinyl ester of an organic acid, and especially in improving the properties of the product of the polymerization of a composition comprising a substance containing a halogen atom and a polymerizable olefinic double bond, such as an alpha-halo-substituted ethylene having from one to two alpha-halo substituents, i. e., a vinyl or vinylidene halide such as vinyl chloride, vinyl fluoride or vinylidene chloride. The term "product of the polymerization of a composition comprising a substance containing a polymerizable olefinic double bond," as used herein, includes copolymers and synthetic rubbers, as well as modified polymers or reaction products of polymers, such as polyvinyl alcohol, polyvinyl butyral and polyvinyl formal.

The polymerization product may be highly plasticized or unplasticized and may be in the form of a water emulsion, a dispersion in an inactive organic solvent, a dispersion in a plasticizer, or a solution in an active solvent.

The inorganic peroxides that may be used in the practice of the present invention include hydrogen peroxide, all other inorganic peroxides, and inorganic hydroperoxides and ozonides, such as the peroxides, hydroperoxides and ozonides of light metals such as lithium, sodium, potassium, magnesium, calcium, strontium and barium and heavy metals such as chromium, copper, cadmium, aluminum, tin, lead, antimony, titanium and silver. Often it is desirable that a peroxide be accompanied by a trace of a metallic silicate such as magnesium silicate in order to improve the stability of the peroxide. Peroxides of alkaline earth metals such as magnesium, calcium, strontium and barium are particularly useful.

A form of inorganic peroxide that is particularly useful in the practice of the invention is a salt, i. e., a complex of hydrogen peroxide with a metal stable complex that is sufficiently stable so that it does not decompose before being incorporated with the other ingredients used. Such complexes include salts of perboric acid ($HBO_3$) with the metals listed in the preceding paragraph, and particularly sodium and the metals of the second group of the periodic classification, such as:

$NaBO_2.H_2O_2$
$NaBO_2.H_2O_2.3H_2O$
$Mg(BO_2)_2.2H_2O_2.1\frac{1}{2}H_2O$
$Mg(BO_2)_2.NaBO_2.3H_2O_2.4H_2O$ The action of the peroxide used in the practice of the present invention is believed to be due in part to its effect upon nascent oxygen. The peroxide is believed to give up oxygen which combines with the nascent oxygen to product molecular oxygen. Such elimination of nascent oxygen from a composition comprising a polymerization product is believed to improve the properties of the composition because nascent oxygen, which may be produced by heat and light from molecular oxygen that has entered the composition from the atomosphere, has a tendency to rupture a chain molecule in the composition in which a double bond occurs, with the formation of aldehyde or carboxylic acid groups at the broken ends of the chain. The presence of such broken chains in the composition impairs the properties of the composition and causes it to deteriorate more readily under the influence of heat and light. Thus nascent oxygen, as it is formed from molecular oxygen by the action of heat and light, is reconverted into molecular oxygen which per se is believed to be harmless, and the composition is protected for a considerable period of time against the degrading effect of nascent oxygen. A perborate when used in the practice of the invention may also combine with polymer molecules containing double bonds to produce branch- or cross-polymerization which inhibits the rupturing action of nascent oxygen.

The peroxide used in the practice of the invention may also cause further polymerization to take place after it is incorporated with the molecules of various chain lengths which are included in a polymerization product. Such further polymerization may cause the chain molecules to approach a uniform, equilibrium length which gives the composition improved properties. The equalization of the lengths of the chains may take place by polymerization or combining of the short chains and depolymerization or shortening of the long chains.

Since metaboric acid is a very weak acid, a perborate ordinarily is alkaline, and has an additional beneficial effect because of its alkalinity. Such additional beneficial effect is to neutralize acidity such as the acidity produced by the formation of carboxylic acid groups at the broken ends of the chains when rupturing by the action of nascent oxygen has taken place. Formation of acidity may occur also in the case of a polymer of an alpha-halo-substituted ethylene or a copolymer thereof and in the case of other halogen-bearing polymers when a hydrogen atom and a halogen atom are split off from two adjacent carbon atoms to form a hydrogen halide, leaving a double bond between the two adjacent carbon atoms. The formation of such double bonds causes darkening of a polymer and may lead to the rupturing of the polymer molecules as explained hereinbefore. The neutralization of such acidity is believed to be beneficial because acidification of a polymer is believed to cause auto-acceleration of the degradation reactions by which the acidity is produced.

The present invention is based upon the discovery that a particularly great improvement in the appearance as well as in the stability and durability of a polymerization product is produced by the use of a peroxide in combination with an agent which is a salt of a metal of group II of the periodic table having an atomic weight between 85 and 140 (i. e., cadmium, barium or strontium) with an acid not stronger than metaboric acid, whose one per cent aqueous solution has a pH from about 8 to about 12.

The improvement produced by the conjoint action of these two agents upon the polymerization product is particularly evident in the improved resistance of the polymerization product to the high temperatures necessitated by the usual methods of processing such as mixing, fusing, preheating, calendering, embossing, molding and extruding. One marked effect of the conjoint action of these two agents is a great reduction in the opacification, discoloration and embrittlement that occur upon exposure of the polymerization product to high temperatures.

When this combination of agents is used, the peroxide serves to stabilize the polymerization product by eliminating nascent oxygen while the other agent serves to stabilize the polymerization product by neutralizing the acidity that occurs in the manner hereinbefore explained. Although an alkali metal perborate when used alone has the effect of neutralizing such acidity, as explained hereinbefore, it has been discovered that the combination of an alkali metal perborate with the additional agent is much more effective in neutralizing such acidity than an alkali metal perborate alone. The greater effectiveness of the additional agent in neutralizing acidity appears to be due to the fact that such additional agent is a salt of barium, strontium or cadmium, although those salts are less alkaline than an alkali metal perborate.

It has been discovered that the use of a salt of barium, strontium or cadmium in the practice of the invention produces much better results than the use of an alkali metal salt, as shown by the actual tests hereinafter described. The results produced by the use of a barium, strontium or cadmium salt in the practice of the invention show a similar marked improvement over the results obtained by the use under similar conditions of a salt of another metal such as magnesium, calcium or zinc. One of the most important advantages of the use of a salt of barium, strontium or cadmium in the production of transparent sheets in accordance with the invention is that the transparency and clarity of the sheets is much greater than can be obtained by the use of an alkali metal salt. A synthetic resin in which a salt of barium, strontium or cadmium has been incorporated in the practice of the invention has superior resistance to blushing because of the insolubility of such salts. For the same reason, such a synthetic resin can be subjected to outdoor exposure or to immersion in water without loss of the salt by leaching. The insolubility of these salts also makes it possible to use them in synthetic resins that are in the form of an emulsion in water. It has been discovered also that perborates of these metals are less difficult than sodium perborate to incorporate in a synthetic resin on rolls in that the perborates of such metals do not have the tendency to deposit on the rolls that is exhibited by sodium perborate.

The use of the combination of agents hereinbefore described renders a polymerization product much more stable than it would be rendered by the use of either agent alone.

The additional agent used may be any barium, strontium or cadmium salt of an organic or inorganic acid not stronger than metaboric acid, whose one per cent aqueous solution has a pH from about 8 to 12. Such substances include the barium, strontium and cadmium salts of organic monobasic acids having not less than four carbon atoms (e. g., saturated fatty acids in the series from butyric to nondecylic acid or unsaturated fatty acids in the series from crotonic to oleic acid, particularly, lauric, stearic, oleic and ricinoleic acids) as well as the barium, strontium and cadmium salts of the oxyacids of boron. It is preferable to use a salt of metaboric acid. The "strength" of an organic or inorganic acid is measured by the dissociation constant ($K_a$) of the acid. There is no particular preferred acid strength (aside from the limitation that the acid be not stronger than metaboric acid) since numerous other factors such as the basicity of the metal, the required physical properties of the salt and the method of incorporation of the agents in the composition are equally influential in the selection of the salt for use in the practice of the invention.

A one per cent aqueous solution of the salt must have a pH from about 8 to about 12, and preferably has a pH from about 9 to about 11. The pH may be measured simply by testing in a Beckmann pH meter a one per cent solution of the salt in distilled water, the distilled water having been boiled to remove carbon dioxide before the solution was made up. (The terms "per cent" and "parts," as used herein to refer to quantities of material, means per cent and parts by weight unless otherwise qualified.)

A metallo-organic ether may also be used as the additional agent in the practice of the invention. For example, such a substance may be an ether of a barium, strontium or cadmium atom with a hydroxy group in the acid or alcohol radical of an ester of a comparatively simple monohydric or polyhydric alcohol such as methyl, ethyl or propyl alcohol, ethylene glycol, propylene glycol, diethylene glycol or gycerin with one of the organic monobasic acids hereinbefore described (e. g., diglycerol tetralaurate, triglycerol, pentaoleate, or triglycerol pentastearate).

A composition embodying the invention may contain not only more than one such additional agent (i. e., more than one cadmium, barium or strontium salt of an acid not stronger than metaboric acid, whose one per cent aqueous solution has a pH from about 8 to about 12) but also more than one peroxide. On the other hand, the peroxide and the additional agent may be in the form of a single stable complex compound. A preferred type of compound that includes both of the agents is a stable complex of hydrogen peroxide and a strontium, barium or cadmium salt of metaboric acid. A cadmium perborate (such as $Cd(BO_2)_2.1\frac{1}{2}H_2O_2.2H_2O$) is particularly useful in the practice of the present invention, but such a stable complex of hydrogen peroxide and a cadmium salt of metaboric acid is more expensive and less readily available than a barium perborate. It is desirable, therefore, that a composition embodying the invention contain a barium perborate, preferably $$Ba(BO_2)_2.1\frac{1}{2}H_2O_2.H_2O$$

It is most desirable that a composition embodying the invention contain both a barium perborate and a cadmium salt of an acid not stronger than metaboric acid, whose one per cent aqueous solution has a pH from about 8 to 12 (e. g., cadmium stearate).

The peroxide may be incorporated in the polymerization product either before, or simultaneously with, or after the incorporation of the other ingredients. The ingredients used in the practice of the invention in each case should be such that the finished composition is slightly or moderately alkaline, i. e., has a pH from about 8 to about 12, although in most cases a composition embodying the invention has a pH at the lower end of such range (i. e., a pH of 7½ to 8). The polymerization product need not be in an alkaline condition before the stabilizing agents are incorporated, since the additional agent tends to render the composition alkaline. The pH of the composition (before or after the addition of the stabilizing agents) may be measured by agitating for five minutes a distilled water suspension of a finely divided sample of the composition and then testing in a Beckmann pH meter in the customary manner or, more rapidly, by the use of the Gramercy Universal indicator, i. e., by violently shaking a finely divided sample (about 1 gram) of the composition and distilled water (10 ml.) in a test tube for five minutes, adding the Universal indicator (0.5 ml.), and determining the pH of the water by comparison with the Gramercy color chart. The distilled water should be boiled before use to remove the carbon dioxide.

In many cases it may be desirable to incorporate plasticizers in order to plasticize sufficiently the polymerizable product, i. e., to obtain the physical properties, such as flexibility, which are imparted by plasticizers. Such plasticizers include the standard commercial esters and other derivatives of phthalic, sebacic, glycolic, oleic, ricinoleic, toluenesulfonic, stearic and other synthetic fatty acids, the most commonly used of which are compounds such as diethylhexyl phthalate and dibutyl sebacate. The proportion and type of plasticizer used depend entirely upon the physical properties desired in the final product embodying the polymerization product. Oleic, stearic, and ricinoleic acids as well as their esters or metal salts (i. e., light or heavy metal salts such as those hereinbefore described, but preferably cadmium, barium or strontium salts) or blown castor oils may also be incorporated as lubricants.

The amount of peroxide or stable peroxide-containing complex (such as a sodium perborate, cadmium perborate, strontium perborate or barium perborate) used in the practice of the invention may range from the minimum amount capable of imparting an appreciable improvement in stability (e. g., about one per cent of the polymerization product) to the maximum amount above which there is no important increase in stabilizing effect (e. g., about one-tenth of the polymerization product). Different substances must be added to the same composition in different proportions to give the same results.

The amount of the additional agent used in the practice of the invention may range from the minimum amount capable of imparting an appreciable improvement in stability and appearance (e. g., about 0.1 per cent of the polymerization product) to the maximum amount above which there is no important increase in stabilizing effect (e. g., about five per cent of the polymerization product). As hereinbefore discussed, it is not necessary to use any additional agent to obtain the desirable effect of the conjoint action of the inorganic peroxide and the additional agent when the peroxide is, for example, a perborate of cadmium, strontium or barium, for such peroxides comprise an additional agent (i. e., barium, strontium or cadmium metaborate) and an inorganic peroxide (hydrogen peroxide).

Even larger amounts of either agent may be employed when a product of extremely high quality is required for heavy duty service, but usually are not necessary. In actual practice, successive increases in the amount of either agent ordinarily produce smaller and smaller improvements in the properties of the material. The proportion of a given agent to be added to the same composition in order to produce the same results varies with the degree to which the agent is dispersed in composition, because the effectiveness of each agent increases with the degree of dispersion. The optimum amounts of the agents depend upon the particular agents and polymerization product to be used; for example, in the case of a high molecular weight copolymer of 95 parts of vinyl chloride and 5 parts of vinyl acetate, a mixture of about 2 parts of $$Ba(BO_2)_2.1\tfrac{1}{2}H_2O_2.H_2O$$

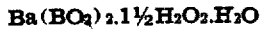

and about 1 part of cadmium stearate has been found to impart the best all-round properties.

The stabilizing agents used in the practice of the invention may be of any good commercial grade. They may be either soluble or insoluble in water. Usually they appear to interact to some extent with the polymerization product in that the water-soluble agents ordinarily are relatively inextractable after being dispersed in such compound.

In order to obtain intimate contact between the stabilizing agents and the polymerization product, a thorough dispersion of the agents in the composition is necessary and therefore, it is desirable that the agents be in the form of fine particles. The preferred procedure comprises grinding a mixture of the agents in a ball mill until 100 per cent of the mixture will pass through a standard 100 mesh screen, and then incorporating the mixture of agents in the composition by means of a rubber mill. (The agents referred to in the subsequent examples are ground substantially to the preferred particle size.)

The incorporation of the stabilizing agents in a composition of the invention may be carried out at ordinary temperatures by means of a ball mill when the composition is in solid form, or by means of any desired dispersing apparatus when the composition is in the form of a liquid solution or dispersion. Although the unique stabilizing effect obtained in the practice of the invention is fundamentally due to the conjoint action of the agents themselves, it has been found that the stabilizing effect may be increased even further by particular modes of incorporating the agents in the composition. For example, when a perborate is used in the practice of the invention, it is sometimes desirable to use a hydrate or a salt containing water of crystallization, since the hydrate is more easily dispersed on a rubber mill to obtain a highly transparent composition that forms a clear film. However, a better dispersion of an anhydrous salt is obtained when it is ground with the polymerization product in a ball mill, and a larger amount of the anhydrous salt may be so incorporated in the resin without causing a film of the resulting product to become milky upon exposure to ultra-violet light. Also, it has been found that the best results are obtained by the incorporation of the stabilizing agents at an elevated temperature. The temperature of incorporation may be any temperature that the composition will stand.

Many of the compositions are solids at ordinary temperatures, and ordinarily it is most convenient to incorporate the agents at an elevated temperature at which the composition is soft enough to be worked but viscous enough to keep the agents in suspension. Any desired apparatus, such as a two-roll rubber mill, a Banbury mixer, a ball mill or a three-roll paint mill, may be used for incorporating the agents in the composition. The period of time required to incorporate the agents is simply that necessary to disperse the agents in the composition to the desired degree. If the incorporation is carried out at ordinary temperatures, the properties of the product sometimes may be improved by holding the product at an elevated temperature after the incorporation of the agents. The time required for such a heat treatment decreases as the temperature increases and depends upon whether it is desired to impart the best possible properties to the product or to impart intermediate properties by a shorter heat treatment.

The magnitude and character of the improvement in appearance and resistance to heat and light produced by treating a composition comprising a polymerization product in accordance with the present invention may be demonstrated by a procedure carried out as follows:

A stable complex of an inorganic peroxide with an additional agent, as hereinbefore defined, is incorporated in a composition consisting of a polymerization product (100 parts of a copolymer consisting of 96 parts of vinyl chloride and 4 parts of vinyl acetate), a plasticizer (a mixture of 45 parts of diethylhexyl phthalate and 5 parts of tricresyl phosphate), and a lubricant (0.75 part of stearic acid) by milling for fifteen minutes on a two-roll rubber mill at 325° F. and then calendering for five minutes on a three-roll calender at 300–310° F. to produce a film having a thickness of 0.010 inch.

Table 1 (below) shows the results of tests of the films prepared as described above, and more specifically describes the compositions from which the films are produced by specifying the stable complex compound and the parts of the stable complex compound (lines 2 and 3, Runs 1A and 1B). For the sake of comparison, test results for control films, i. e., films from a composition which is the same except that it contains a perborate of an alkali metal with no additional agent (line 4, Run 1C) are included in Table 1.

The tests employed are standard tests for synthetic film material and are considered to be capable of showing generally the characteristics that are important in industrial film materials of this class. A separate description of the procedure and the manner of obtaining the results in each test follows.

Transparency (line 5).—A film of the composition after it has been processed (i. e., milled and calendered) is visually examined against a background of black. The transparency is denoted by the following numerical grades:

1. (Excellent) Completely transparent film.
2. (Very good) Very slight cloud apparent in the film upon close observation.
3. (Good) Slight cloud in the film.
4. (Fair) Cloudy film.
5. (Poor) Milky film having cloudiness appreciably affecting the transparency.

Clarity, i. e., resistance to discoloration (usually yellowing) (line 6).—A film of the composition after it has been processed is visually examined against a background of white. The clarity is denoted by the following numerical grades:

1. (Excellent) Film is water white.
2. (Very good) Film is very light gray.
3. (Good) Film is gray.
4. (Fair) Film is light yellow.
5. (Poor) Film is dark yellow or light brown.

Blushing tests (line 7).—Films of the composition are immersed half way in distilled water and examined at various time intervals to determine the resistance of the films to blushing by comparing the water-immersed half of the film with the half which is not immersed. Milkiness of the half which is immersed indicates that the film has started to blush.

Heat aging tests (line 8).—Films of the composition are subjected to a temperature of 350° F. in a convection oven (in which the temperature is controlled by an electrical thermostat) for periods of time such as 15 minutes, 30 minutes, 45 minutes and 60 minutes. These tests determine the resistance of the film to deterioration or aging by the action of heat. The heat resistance at 350° F. (line 8) is denoted by the following numerical grades:

1. (Excellent) Moderate discoloration (yellowing) of the film in 60 minutes.
2. (Very good) Moderate discoloration (yellowing) and slight stiffening of the film in 45 minutes.
3. (Good) Pronounced discoloration (yellowing) and slight stiffening of the film in 45 minutes.
4. (Fair) Moderate discoloration (yellowing) and stiffening of the film in 30 minutes.
5. (Poor) Pronounced discoloration (yellowing) and stiffening of the film in 30 minutes.

Fadeometer test (line 9).—The films of the composition after processing are exposed to ultra-violet light from a carbon arc in an Atlas FDA Fadeometer at 125° F. The test determines the resistance of the film to deterioration by the action of ultra-violet light, and the results given are the hours of exposure required to cause substantial deterioration either in the form of brown spots in the film or in the form of uniform discoloration.

Accelerated weathering test (line 10).—The films are tested in a National Carbon Model X-1-A unit, and the results obtained are the hours of exposure required to cause substantial deterioration either in the form of brown spots or in the form of uniform discoloration of the film.

Natural weathering test (line 11).—The films are exposed to natural weather conditions in Miami, Florida, and the results obtained are the number of ultra-violet hours (calculated on the basis of the "standard ultra-violet hour") of exposure required to cause substantial deterioration of the film as described for the Fadeometer and accelerated weathering tests.

The film properties disclosed in transparency and clarity tests are altered to some extent by variations in the methods of processing, such as variations in the milling time and temperature. In order to determine the length of time a composition may be processed at a given temperature without substantial decrease in transparency and clarity, i. e., the heat life during processing, the composition is milled for longer periods, e. g., 45 minutes to one hour, and tested at intervals during milling.

Heat processing tests (line 12).—The composition is milled for one hour on a two-roll rubber mill at 325° F. At five minute intervals during the processing samples are calendered for five minutes on a three-roll calender at 300 to 310° F. to produce a film having a thickness of 0.010 inch. The films are examined for transparency and clarity. The heat life during processing is denoted by the following numerical grades:

1. (Excellent) Film has excellent transparency and clarity after 35 minutes of processing.
2. (Very good) Film has good transparency and clarity after 35 minutes of processing.
3. (Good) Film has good transparency and clarity after 25 minutes of processing.
4. (Fair) Film has fair transparency and clarity after 25 minutes of processing.
5. (Poor) Film has poor transparency and clarity after 20 minutes of processing.

Table 1

| 1 | Run Number | 1A | 1B | 1C |
|---|---|---|---|---|
|   |   | Parts | Parts | Parts |
| 2 | $Ba(BO_3)_2.1\tfrac{1}{2}H_2O_2.H_2O$ | 2 |   |   |
| 3 | $Cd(BO_3)_2.1\tfrac{1}{2}H_2O_2.H_2O$ |   | 2 |   |
| 4 | $Na(BO_3).H_2O_2.3H_2O$ (Control) |   |   | 2 |
| 5 | Transparency (grade) | 1 | 1 | 5 |
| 6 | Clarity (grade) | 2 | 1 | 5 |
| 7 | Blushing (hours) | 1 | 1 | ¼ |
| 8 | Heat Aging (grade) | 2 | 1 | 4 |
| 9 | Fadeometer Test (hours) | 390 | 570 | 435 |
| 10 | Accelerated Weathering | 600 | 700 | 500 |
| 11 | Natural Weathering | 750 | 900 | 650 |
| 12 | Heat processing (grade) | 2 | 1 | 5 |

From Table 1 it can be seen that films from compositions containing a perborate of cadmium or barium (Runs 1A and 1B) have substantially better clarity and transparency and resistance to blushing than films from compositions containing a perborate of an alkali metal and no additional agent (Run 1C). Furthermore, compositions containing both an inorganic peroxide and an additional agent, as hereinbefore defined, have greater resistance to deterioration by the action of heat than have similar compositions which contain no additional agent, as evidenced by the results of the heat aging tests, and at high fluxing temperatures such compositions decompose at a much slower rate so that less discoloration and better and more efficient stabilization is assured, as evidenced by the results of the heat processing tests. The results of the tests for determining the resistance to light (Fadeometer, accelerated weathering and natural weathering tests) show that perborates of cadmium or barium also improve the light resistance of polymerization products.

In addition to the marked improvement in transparency, clarity, heat stability, etc. imparted to a polymerization product by a perborate of barium, strontium or cadmium, the use of such a stabilizer has the additional advantage over a perborate of an alkali metal that it may be used in a composition containing red or maroon pigments derived from beta-hydroxy naphthoic acids. Such compositions are very sensitive to the action of alkali metals. Their shade turns yellow or orange and their resistance to light and the leaching action of water is thoroughly impaired. However, a stabilizer consisting of a perborate of cadmium, barium or strontium produces none of these undesirable effects, as demonstrated by tests carried out as follows (the results of which are shown in Table 2 below):

A stable complex of an inorganic peroxide with an additional agent (1.5 parts of $$Ba(BO_2)_2.1\tfrac{1}{2}H_2O_2.H_2O$$

is incorporated in a composition comprising a polymerization product (100 parts of a high molecular weight copolymer consisting of 96 parts of vinyl chloride and 4 parts of vinyl acetate), a plasticizer (a mixture of 45 parts of diethylhexyl phthalate and 5 parts of tricresyl phosphate) a lubricant (0.75 part of stearic acid) and a red organic pigment (2 parts of a calcium salt of azo-beta-hydroxy naphthoic acid) by milling until the composition becomes homogeneous (approximately ten minutes) at 325° F., and then calendering for five minutes on a three-roll calender at 300 to 310° F. to produce a film having a thickness of 0.010 inch. Films of the composition are tested for light resistance by the procedures hereinbefore described, the results in lines 2, 3 and 4 in Table 2 indicating the hours of exposure required to cause deterioration in the form of fading. The heat life of the composition during processing is tested by milling for thirty minutes at 325° F. and then calendering for five minutes on a three-roll rubber mill at 300 to 310° F.

Films of a similar composition which contains a perborate of an alkali metal (2.25 parts of $$NaBO_2.H_2O_2.3H_2O)$$

(the control in Table 2) in place of the barium perborate are also tested for light resistance and heat life during processing.

salt in combination with an inorganic peroxide, as hereinbefore discussed. It is believed that the formation of complexes or addition products between the inorganic peroxide and the additional agent substantially strengthens the action on nascent oxygen hereinbefore described.

It is often desirable to incorporate in the composition other ingredients such as fillers, pigments or opacifiers. In fact, such ingredients may have the effect of "screening" or decreasing the amount of light which may enter the body of the composition, and thereby increasing the resistance of the composition to light. The intended use of the composition comprising the polymerization product determines to a certain extent the agents or ingredients to be incorporated in the composition; but, of course, the ingredients must be compatible in the sense that they are capable of forming a stable suspension, dispersion or solution. Logically, if any substantial quantity of fillers, pigments or opacifiers is used in the composition, the highest degree of compatibility or uniformity may not be required. Since the tests hereinbefore described, which are used for the purpose of determining the properties of the films of the compositions, are essentially visual examinations of the films, these tests are less effective for specifically determining such properties as compatibility (i. e., transparency and dispersion), discoloration, heat resistance, and light resistance (i. e., Fadeometer, accelerated weathering and natural weathering tests) when the composition comprising the polymeric organic compound also contains fillers, pigments or opacifiers; and, therefore, the preferred procedure for determining specifically such properties of the compositions consists in the preparation and testing of transparent films.

The following examples illustrate the practice of the invention:

*Example 1*

A stable complex of an inorganic peroxide with an additional agent (2 parts of $$Ba(BO_2)_2.1\tfrac{1}{2}H_2O_2.H_2O)$$

is incorporated in a composition comprising a polymerization product (a high molecular weight copolymer of 96 parts of vinyl chloride and 4

*Table 2*

| | | Films containing $Ba(BO_2)_2.1\tfrac{1}{2}H_2O_2.H_2O$ | Films containing $NaBO_2.H_2O.3H_2O$ (Control) |
|---|---|---|---|
| 1 | Color after 2 minutes on mill | deep red | orange red. |
| 2 | Fadeometer Test (hours) | 650 | 400. |
| 3 | Accelerated Weathering (hours) | 500 | 300. |
| 4 | Natural Weathering (Ultra-violet hours) | 350 | 200. |
| 5 | Heat Processing (color after thirty minutes on mill) | deep bluish-red good transparency. | orange red milky. |

The beneficial action of the stabilizing agents used in the practice of the invention cannot be explained on the ground of alkalinity alone; first, because the improvement produced by the incorporation of the present agents is far greater than the improvement that can be produced by the mere incorporation of an alkaline agent, and, second, because the improvement involves other phenomena which do not normally accompany the property of alkalinity, e. g., improvement in clarity. Furthermore, the fact that the additional agent is a salt of barium, strontium, or cadmium results in even greater improvement in stability, durability and appearance than can be obtained with, for example, an alkali metal parts of vinyl acetate), a plasticizer (a mixture of 45 parts of diethylhexyl phthalate and 5 parts of tricresyl phosphate) and a lubricant (.75 part of stearic acid) by milling for fifteen minutes on a two-roll rubber mill at 325° F. and then calendering for five minutes on a three-roll calender at 300 to 310° F. to produce a film having a thickness of 0.010 inch. The film so produced has very good clarity and excellent transparency. In the standard heat aging test the results obtained from the film are excellent and the heat life of the composition during processing is very good. The film resists blushing for two hours.

The appearance and stability of the composition are greatly reduced when the additional agent is omitted. For example, the procedure described above is repeated except that $$NaBO_2.H_2O_2.3H_2O$$

(2 parts) is used in place of the barium perborate. The film so produced has poor transparency and clarity and the heat resistance is considerably reduced in that in the heat aging test the results obtained are only fair. The heat lift of the composition during processing also is only fair. Furthermore, the film blushes after one-quarter of an hour.

*Example 2*

A stable complex of an inorganic peroxide with an additional agent (2 parts of $$Ba(BO_2)_2.1½H_2O_2.H_2O$$

is incorporated in a composition comprising a polymerization product (100 parts of polyvinyl chloride), a plasticizer (a mixture of 50 parts of diethylhexyl phthalate and 5 parts of tricresyl phosphate), and a lubricant (1 part of stearic acid) by milling for fifteen minutes on a two-roll rubber mill at 325° F. and then calendering for five minutes on a three-roll calender at 300 to 310° F. to produce a film having a thickness of 0.010 inch. The film so produced has excellent transparency and a good heat resistance. Such a film is substantially unchanged in color and flexibility after 700 hours of exposure in the Fadeometer test, after 500 hours of exposure in the accelerated weathering test, after 800 hours of exposure in the natural weathering test. The heat life of the composition during processing is excellent. A film of the composition resists blushing for two hours.

A film produced from a similar composition in which $NaBO_2.H_2O_2.3H_2O$ (2.25 parts) is used in place of the barium perborate shows equally good results in the heat aging test, Fadeometer test and accelerated weathering test as a film produced as described in the preceding paragraph. Such a film, however, has only fair transparency, and in the natural weathering test discolors after only 650 hours of exposure. Furthermore, the heat life of the composition during processing is only fair and a film of the composition blushes after one hour.

*Example 3*

A stable complex of an inorganic peroxide with an additional agent (2.5 parts of $$Ba(BO_2)_2.1½H_2O_2.H_2O$$

is incorporated in a composition comprising polyvinyl butyral (100 parts), polyethylene glycol dihexoate (20 parts), diethylhexyl sebacate (20 parts) and stearic acid (1 part) by milling for fifteen minutes on a two-roll rubber mill at 325° F. and then calendering for five minutes on a three-roll calender at 300 to 310° F., to produce a film having a thickness of 0.010 inch. The film so produced has good transparency and clarity and fair heat resistance. In the Fadeometer test the film is substantially unchanged in color but is somewhat stiff after 112 hours of exposure. In the accelerated weathering test the film becomes very light yellow after 280 hours of exposure.

The results of the tests on films produced by the procedure described in the preceding paragraph are better by at least 1 grade than the results obtained by the same tests on a film produced from a similar composition in which $$NaBO_2.H_2O_2.3H_2O$$

(3 parts) is used in place of the barium perborate.

The latter film has only fair clarity and transparency and poor heat resistance. In the Fadeometer test the film is substantially unchanged in color but is brittle after 112 hours of exposure. In the accelerated weathering test the film becomes light yellow after 280 hours of exposure.

*Example 4*

An inorganic peroxide (1.5 parts of $$NaBO_2.H_2O_2 3H_2O)$$

and an additional agent (1 part of cadmium stearate) are incorporated in a composition comprising a polymerization product (a mixture of 80 parts of polyvinyl chloride and 20 parts of a copolymer consisting of 9 parts of vinyl chloride and 1 part of vinylidene chloride), and a plasticizer (a mixture of 45 parts of diethylhexyl phthalate and 5 parts of tricresyl phosphate) by milling for fifteen minutes on a two-roll rubber mill at 325° F. and calendering for five minutes on a three-roll calender at 300 to 310° F. to produce a film having a thickness of 0.010 inch. The film so produced has fair transparency and good clarity. The heat life of the composition during processing is very good.

When the additional agent is omitted from the composition, the appearance of the composition is impaired, and the stability is reduced. For example, another procedure is carried out that is the same as that described in the foregoing paragraph except that the cadmium stearate is not added. The film so produced has fair transparency and fair clarity, and the heat life of the composition during processing is only fair.

Other additional agents such as the barium, strontium or cadmium salts of organic monobasic acids having not less than four carbon atoms and of the oxyacids of boron, as hereinbefore described, may be used in place of the cadmium stearate to produce similar improvements in stability and appearance. For example, the use of 1 part of cadmium 2-ethylhexoate instead of the cadmium stearate in the composition described above imparts good clarity and good transparency.

*Example 5*

A stable complex of an inorganic peroxide and an additional agent (1 part of $Ba(BO_2)_2.1½H_2O_2.H_2O$)

and another additional agent (1 part of cadmium 2-ethylhexoate) are incorporated in a composition comprising a polymerization product (a mixture of 80 parts of polyvinyl chloride and 20 parts of a copolymer consisting of 9 parts of vinyl chloride and 1 part of vinylidene chloride), and a plasticizer (a mixture of 45 parts of diethylhexyl phthalate and 5 parts of tricresyl phosphate) by milling for fifteen minutes on a two-roll rubber mill at 325° F. and calendering for five minutes on a three-roll calender at 300 to 310° F. to produce a film having a thickness of 0.010 inch. The film so produced has excellent transparency and excellent clarity. The heat life of the composition during processing is also excellent.

Other additional agents, for example, 1 part of cadmium stearate or 1 part of barium ricinoleate, may be used in place of the cadmium 2-ethylhexoate to produce compositions whose films have very good clarity and transparency and whose heat life during processing is very good.

Example 6

An inorganic peroxide
(1.75 parts of $NaBO_2.H_2O_2.3H_2O$)
and an additional agent 1 part of strontium naphthenate) are incorporated in a composition comprising a polymerization product (a mixture of 80 parts of high molecular weight polyvinyl chloride and 20 parts of a copolymer consisting of 9 parts of vinyl chloride and 1 part of vinylidene chloride), a plasticizer (a mixture of 45 parts of diethylhexyl phthalate and 5 parts of tricresyl phosphate), and a lubricant (0.75 part of stearic acid) by milling for fifteen minutes on a two-roll rubber mill at 325° F. and calendering for five minutes on a three-roll calender at 300 to 310° F. to produce a film having a thickness of 0.010 inch. The film so produced has good transparency and good clarity. The heat life of the composition during processing is also good.

Example 7

An inorganic peroxide
(2 parts of $Cd(BO_2)_2.1\frac{1}{2}H_2O_2.2H_2O$)
and an additional agent 1 part of strontium naphthenate) are incorporated in a composition comprising a polymerization product (a mixture of 80 parts of high molecular weight polyvinyl chloride and 20 parts of a copolymer consisting of 9 parts of vinyl chloride and 1 part of vinylidene chloride), a plasticizer (a mixture of 45 parts of diethylhexyl phthalate and 5 parts of tricresyl phosphate), and a lubricant (0.75 part of stearic acid) by milling for fifteen minutes on a two-roll rubber mill at 325° F. and calendering for five minutes on a three-roll calender at 300 to 310° F. to produce a film having a thickness of 0.010 inch. The film so produced has very good transparency and very good clarity. The heat life of the composition during processing is between good and very good.

Having described the invention, I claim:

1. A method of improving the properties of the product of the polymerization of a composition comprising a substance whose molecule contains a polymerizable olefinic double bond that comprises subjecting it to intimate contact with (a) an inorganic peroxide and (b) a salt of a metal of group II of the periodic table having an atomic weight between 85 and 140 with an acid not stronger than metaboric acid, whose one per cent aqueous solution has a pH from about 8 to about 12.

2. A method of improving the properties of the product of the polymerization of a composition comprising a substance whose molecule contains a halogen atom and a polymerizable olefinic double bond that comprises subjecting it to intimate contact with (a) an inorganic peroxide and (b) a salt of a metal of group II of the periodic table having an atomic weight between 85 and 140 with an acid not stronger than metaboric acid, whose one per cent aqueous solution has a pH from about 8 to about 12.

3. A method of improving the properties of the product of the polymerization of a composition comprising an alpha-halo-substituted ethylene having from one to two alpha-halo substituents that comprises subjecting it to intimate contact with (a) an inorganic peroxide and (b) a salt of a metal of group II of the periodic table having an atomic weight between 85 and 140 with an acid not stronger than metaboric acid, whose one per cent aqueous solution has a pH from about 8 to about 12.

4. A method of improving the properties of the product of the polymerization of a composition comprising an alpha-halo-substituted ethylene having from one to two alpha-halo substituents that comprises subjecting it to intimate contact with a perborate of a metal of group II of the periodic table having an atomic weight between 85 and 140.

5. A method of improving the properties of the product of the polymerization of a composition comprising an alpha-halo-substituted ethylene having from one to two alpha-halo substituents that comprises subjecting it to intimate contact with a barium perborate and a calcium salt of an acid not stronger than metaboric acid, whose one per cent aqueous solution has a pH from about 8 to about 12.

6. A composition of improved stability and durability including the product of the polymerization of a composition comprising a substance whose molecule contains a polymerizable olefinic double bond, and, intimately incorporated therewith, (a) an inorganic peroxide and (b) a salt of a metal of group II of the periodic table having an atomic weight between 85 and 140 with an acid not stronger than metaboric acid, whose one per cent aqueous solution has a pH from about 8 to about 12.

7. A composition of improved stability and durability including the product of the polymerization of a composition comprising a substance whose molecule contains a halogen atom and a polymerizable olefinic double bond, and, intimately incorporated therewith, (a) an inorganic peroxide and (b) a salt of a metal of group II of the periodic table having an atomic weight between 85 and 140 with an acid not stronger than metaboric acid, whose one per cent aqueous solution has a pH from about 8 to about 12.

8. A composition of improved stability and durability including the product of the polymerization of a composition comprising an alpha-halo-substituted ethylene having from one to two alpha-halo substituents, and, intimately incorporated therewith, (a) an inorganic peroxide and (b) a salt of a metal of group II of the periodic table having an atomic weight between 85 and 140 with an acid not stronger than metaboric acid, whose one per cent aqueous solution has a pH from about 8 to about 12.

9. A composition of improved stability and durability including the product of the polymerization of a composition comprising an alpha-halo-substituted ethylene having from one to two alpha-halo substituents, and, intimately incorporated therewith, a perborate of a metal of group II of the periodic table having an atomic weight between 85 and 140.

10. A composition of improved stability and durability including the product of the polymerization of a composition comprising an alpha-halo-substituted ethylene having from one to two alpha-halo substituents, and, intimately incorporated therewith, a barium perborate and a cadmium salt of an acid not stronger than metaboric acid, whose one per cent aqueous solution has a pH from about 8 to about 12.

11. A composition of improved stability and durability including the product of the polymerization of a composition comprising an alpha-chloro-substituted ethylene having from one to two alpha-chloro substituents, and, intimately incorporated therewith, a barium perborate.

12. A composition of improved stability and durability including the product of the polymerization of a composition comprising an alpha-chloro-substituted ethylene having from one to two alpha-chloro substituents, and, intimately incorporated therewith, a cadmium perborate.

13. A composition of improved stability and durability including the product of the polymerization of a composition comprising an alpha-chloro-substituted ethylene having from one to two alpha-chloro substituents, and, intimately incorporated therewith, a strontium perborate.

14. A composition of improved stability and durability including the product of polymerization of a composition comprising an alpha-halo-substituted ethylene having from one to two alpha-halo substituents, and, intimately incorporated therewith, (a) an inorganic peroxide and (b) a cadmium salt of an acid not stronger than metaboric acid, whose one per cent aqueous solution has a pH from about 8 to about 12.

15. A composition as claimed in claim 14 wherein the cadmium salt is cadmium stearate.

CHARLES J. CHABAN.

REFERENCES CITED

The following references are of record in the file of this patent:

UNITED STATES PATENTS

| Number | Name | Date |
|---|---|---|
| 2,487,099 | Chaban | Nov. 8, 1949 |